July 11, 1939.  G. R. BAKER ET AL  2,165,528
ROTARY DOUGH MOLDING MACHINE FOR BISCUIT DOUGHS AND THE LIKE
Filed Oct. 25, 1937    2 Sheets-Sheet 2

INVENTORS
G. R. Baker +
G. D. Wilson
By George B. Willey
Attys.

Patented July 11, 1939

2,165,528

UNITED STATES PATENT OFFICE 2,165,528

ROTARY DOUGH MOLDING MACHINE FOR BISCUIT DOUGHS AND THE LIKE

George Ralph Baker and George Donald Wilson, Peterborough, England

Application October 25, 1937, Serial No. 170,948
In Great Britain October 27, 1936

6 Claims. (Cl. 107—8)

This invention relates to rotary molding machines for biscuit doughs and the like having a blunt-ended knife located in the nip between the die roll and pressure roll such as described in British specification No. 21,332 of 1935 in which the knife presents a substantial transverse surface opposed to the flow of dough between the rolls.

The objects of the present invention are to provide means adapted to improve the filling of the dough cavities; to avoid undue friction between the dough and the knife, and to allow for the recovery or swelling of the dough as soon as it has passed the knife edges which sever or divide the dough.

The invention consists in the provision of a knife or scraper element affording a dough dividing edge at each side (one for co-operating with the die roll and the other with the pressure roll) and provided with a face transverse of the nip and inclined at a small angle to a straight line joining the axes of the rolls, such that the pressure of the dough on the inclined face tends to force the knife towards the die roll.

According to an alternative the knife or scraper may have a face normal to the direction of flow of dough into the roll nip and resilient means be provided to press the knife element towards the die roll.

The invention further consists in a knife or scraper having a neck or tapered or recessed part in rear of the dough dividing edges, so that as soon as the dough has passed by the edges, clearance is afforded in which the dough can swell or recover, and undue friction or dragging action on the dough is avoided.

It is preferred that the tapered or recessed portions should commence immediately in rear of the dough dividing edges but where a thickness of metal is allowed as for sharpening it is preferred that this marginal portion should be kept small in order to avoid an undue amount of surface contact against the dough.

Figure 1:
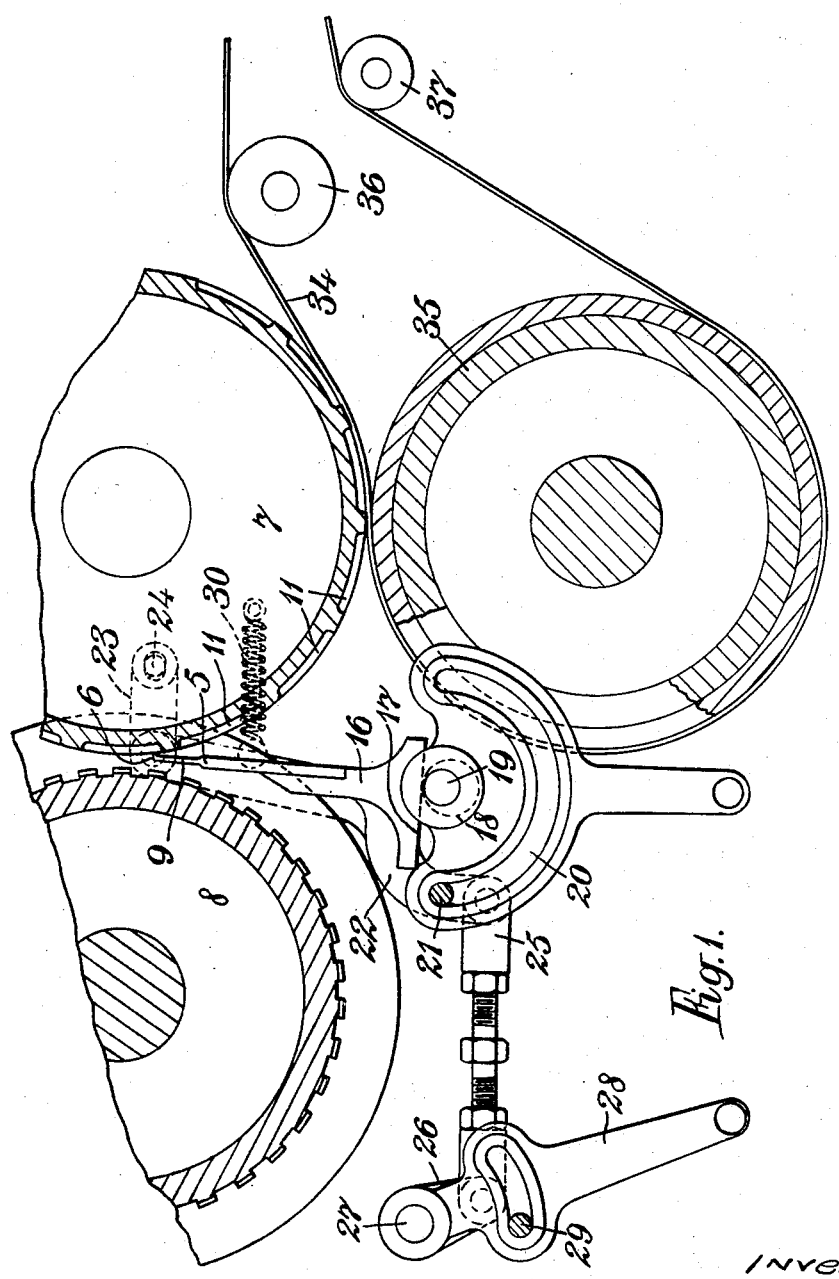
Figure 1 is a sectional elevation of a rotary dough molding machine having the improved knife or scraper applied thereto.

In carrying the invention into effect according to one convenient mode, a knife element 5 consisting of a substantial metal plate is provided with a bevelled or chamfered upper edge 6 the angle of inclination being not more than 45° and not less than 10° to a straight line joining the axes of the die roll or molding drum 7 and the pressure roll 8. In rear of the inclined face 6 which may have an approximate dimension of ¼ inch as measured transversely of the nip of the roll and drum, the plate is hollowed out on both sides to form a neck or recessed part 9. The knife is positioned with the narrower dough dividing edge 10 against the die roll 7 and so that the pressure of dough (being drawn between the rolls) on the inclined face 6 tends to force the knife towards the die roll to maintain the dough dividing edge 10 in active co-operation with the dies 11.

The rolls 7 and 8 are spaced apart a distance to afford a nip wider than the top of the knife plate 5 so that a layer of dough 12 is left upon the pressure roll 8 and the edge 13 of the knife on the pressure roll side is adapted to keep this layer smooth and even.

Figure 2:
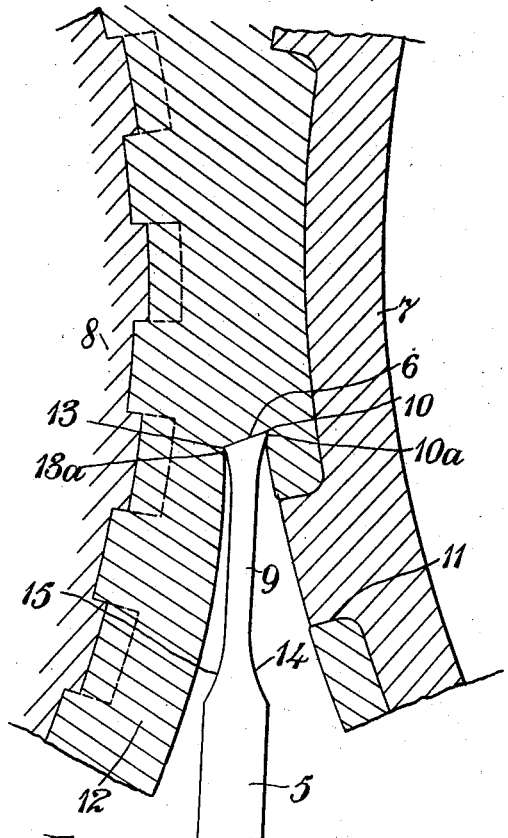
Figure 2 is a view of the knife and the immediately adjacent parts of the machine to a larger scale.

The arcuate recesses 14 and 15 referred to above may extend directly from the dough dividing or cutting edges 10 and 13 but where it is desired to afford a margin for sharpening purposes the cavities 14, 15 may commence a short distance behind these edges, leaving a marginal surface such as 10a, 13a (Figure 2) tangential (or approximately so) to the roll circumferences. These marginal surfaces should not be of greater depth than about half the width of the top surface 6 of the knife plate. Although it is preferred to employ arcuate recesses or cavities 14, 15 it will be appreciated that the knife plate may instead be tapered or provided with recesses of other shape.

The knife or scraper 5 is mounted upon a carrier 16 which has a base or foot 17 seated upon a bar 18 eccentric to a shaft 19. The shaft 19 is mounted in suitable bearings in the machine frame not shown and is adapted to be rotated by a sector 20 whereby the eccentric bar is adjusted to vary the distance to which the knife 5 extends into the bight of the rolls 7 and 8. A locking bolt 21 secured to a relatively stationary part such as the side frame of the machine is provided for locking the sector in its adjusted position.

The carrier has secured to it a lever 22 the upper end of which is pivoted to a link 23 supported upon a spindle 24.

The lower end of the lever is coupled by an adjustable coupling 25 to an arm 26 on a rock shaft 27. The shaft 27 is provided with an arm 28 whereby it may be oscillated to adjust the angle of the knife 5 to the surface of the molding roll 7.

A locking bolt 29 is provided for locking the arm 28 in its adjusted position. The link 23 permits both adjustments of the arm and by a slotted connection with the spindle 24 permits a certain amount of relative radial movement between the knife and the roll 7 to ensure the necessary engagement between such parts.

A spring 30 is provided, connected at one end to the lever 22 to hold the knife in contact with the die roll. In operation, however, the spring may not be required as the action of the dough upon the inclined surface 6 will hold the knife against the surface of the mold. In view, however, of the slotted support for the link 23 it is desirable to employ the spring.

Figure 3:
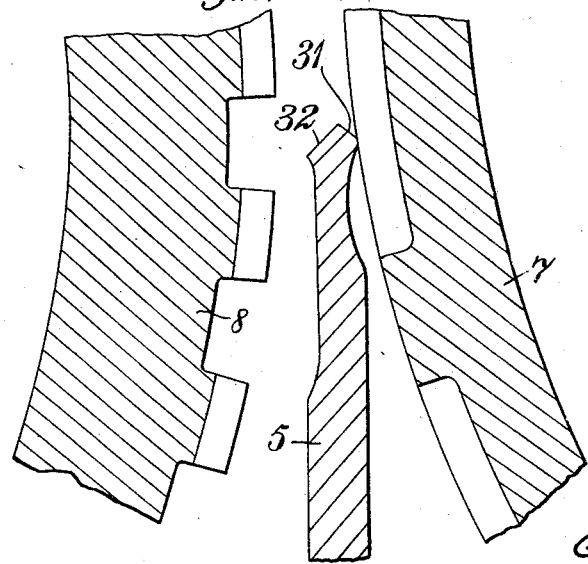
Figure 3 is a similar view of a modified construction of knife.
Figure 4:
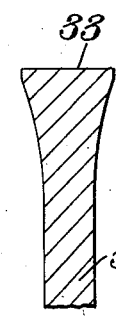
Figure 4 is a further modified form.

As an alternative to providing a plain inclined surface across the top of the knife plate, the upper edge may be of blunt wedge form, as shown in Figure 3, that is to say it may have two inclined surfaces 31 and 32. The area of the wedge surfaces may be unequal, the surface 32 towards the pressure roller 8 being larger than the surface 31 towards the die roller 7 so that the pressure of the dough on the knife is unbalanced and tends to urge the knife towards the die roller.

Where the knife is provided with a transverse surface 33 (Figure 4) normal to the flow of dough through the nip or where an equal faced wedge form is adopted as indicated above the knife may be maintained in working contact with the surface of the die roll by resilient pressure effected by mounting the knife 5 on a hinge or otherwise affording capacity for displacement or flexibility and introducing spring means between the knife plate and a backing or abutment element located on the side towards the pressure roller. Alternatively, the knife plate 5 may be fixed to a cross shaft mounted in bearings, a coil spring being positioned around one or both ends of the shaft to press the plate over towards the die roller. Means may be provided for adjusting the degree of resilient pressure exercised by the spring means.

A discharge apron 34 is provided driven and supported by a roll 35 and guide rolls 36, 37.

While the inclined or transverse surfaces of the knife would usually be plane areas, these may, if desired, be slightly curved so that they present either a convex or concave surface towards the dough being fed towards them.

Having now described our invention what we claim as new and desire to secure by Letters Patent is:

1. A rotary molding machine for biscuit doughs and the like comprising a molding roll and a co-operating pressure roll, a knife or scraper element having a dough dividing edge at each edge of a surface transverse to the nip of the rolls, one of said edges co-operating with the molding roll and the other with the pressure roll, the surfaces adjacent the rear of said dividing edges being cut away to afford clearance to the dough to swell or recover when it has passed said edges, and means for yieldingly forcing the knife toward the molding roll.

2. A rotary dough molding machine as claimed in claim 1, wherein the knife is yieldingly forced toward the molding roll by spring means.

3. A rotary dough molding machine as claimed in claim 1, wherein said transverse surface is inclined at a relatively small angle to the plane containing the axes of the rolls, such that the pressure of the dough on the inclined face tends to force the knife towards the die roll.

4. A rotary dough molding machine for biscuit doughs and the like comprising a molding roll and a co-operating pressure roll, a knife or scraper element having a dough dividing edge at the outer edge of each of a pair of surfaces inclined to the plane containing the axes of the rolls and intersecting in a blunt edge occupying an intermediate position removed from both rolls, the surface adjacent the pressure roll being of larger area than that adjacent the die roll so that the pressure of the dough tends to force the knife towards the die roll, the surfaces adjacent the rear of said dividing edges being cut away to afford clearance for the dough to swell or recover when it has passed said edges.

5. A rotary dough molding machine as claimed in claim 1, wherein said transverse surface is normal to the flow of dough through the nip, and spring means are provided for holding the knife in working contact with the surface of the die roll.

6. A rotary dough molding machine as claimed in claim 1, wherein means is provided for adjusting the angle of the knife to the surface of the roll and the extent to which the knife enters between the rolls.

GEORGE RALPH BAKER.
GEORGE DONALD WILSON.